US012710758B2

(12) United States Patent
Qi et al.

(10) Patent No.: US 12,710,758 B2
(45) Date of Patent: Aug. 18, 2026

(54) ADAPTIVE INTERACTIVE HUMAN-MACHINE INTERFACE FOR TRANSFER OF CONTROL IN AUTONOMOUS VEHICLE SIMULATION

(71) Applicant: GM Global Technology Operations LLC, Detroit, MI (US)

(72) Inventors: Wenyuan Qi, Shanghai (CN); Zhengyu Xing, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 143 days.

(21) Appl. No.: 18/787,069

(22) Filed: Jul. 29, 2024

(65) Prior Publication Data

US 2026/0029787 A1 Jan. 29, 2026

(30) Foreign Application Priority Data

Jul. 24, 2024 (CN) ........................ 202411004234.3

(51) Int. Cl.
*G05D 1/227* (2024.01)
*B60W 50/14* (2020.01)
*G09B 9/00* (2006.01)

(52) U.S. Cl.
CPC .................................. *G05D 1/227* (2024.01)

(58) Field of Classification Search
None
See application file for complete search history.

(56) References Cited

U.S. PATENT DOCUMENTS

2016/0009281 A1* 1/2016 Tokimasa .............. B60W 30/16 701/96
2016/0210383 A1* 7/2016 Alaniz ..................... G09B 9/05
2022/0026903 A1* 1/2022 Wimmer .............. G05D 1/0231
2023/0174135 A1* 6/2023 Kawakami ............. B62D 1/046 701/36
2024/0343293 A1* 10/2024 Kohári ................... B62D 1/286

FOREIGN PATENT DOCUMENTS

CN 116901991 A * 10/2023 ............ B60W 50/14
DE 102016100492 A1 7/2016
DE 102021201541 A1 1/2022
WO WO-2024186073 A1 * 9/2024 ............ B60K 35/81

* cited by examiner

*Primary Examiner* — Madison R. Inserra
(74) *Attorney, Agent, or Firm* — Vivacqua Crane, PLLC

(57) ABSTRACT

A driver-in-loop simulator, comprising a vehicle seat, a driver view display, a human-machine interface (HMI) display, an input device and a controller in communication with the driver view display, the HMI display, and the input device. The controller includes a processor and a non-transitory computer readable medium in communication with the processor. The controller is programmed to detect a transfer of control (TOC) event, display a notification on the HMI display that the TOC event has occurred in response to detecting the TOC event and detect an input provided by a user of the driver-in-loop simulator through the input device, wherein the input is indicative that the user took control of a simulation experienced through the driver-in-loop simulator.

11 Claims, 2 Drawing Sheets

ADAPTIVE INTERACTIVE HUMAN-MACHINE INTERFACE FOR TRANSFER OF CONTROL IN AUTONOMOUS VEHICLE SIMULATION

INTRODUCTION

The present disclosure generally relates to methods and systems for adaptive interactive human-machine interface (HMI) for transfer of control in autonomous vehicle simulation.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Some autonomous vehicles require human drivers to take over under certain circumstances, like unexpected vehicle behavior. The transfer of control (TOC) mechanism can help the driver smoothly take over the vehicle while avoiding risks. To help the TOC mechanism, it is desirable to develop an adaptive HMI system for a simulation system.

SUMMARY

A driver-in-loop simulator includes a vehicle seat, a driver view display, a human-machine interface (HMI) display, one or more input devices, and a controller in communication with the driver view display, the HMI display, and the input device. The controller includes a processor and a non-transitory computer readable medium in communication with the processor. The controller is programmed to: detect a transfer of control (TOC) event; in response to detecting the TOC event, display a notification on the HMI display that the TOC event has occurred; and in response to detecting the TOC event, detect an input provided by a user of the driver-in-loop simulator through the input device, where the input is indicative that the user took control of a simulation experienced through the driver-in-loop simulator. A TOC event is an event in which a human driver should disengage autonomous driving and should take manual control of the autonomous vehicle. Other embodiments of this aspect include corresponding computer systems, apparatus, and computer programs recorded on one or more computer storage devices, each configured to perform the actions of the methods. The driver-in-loop simulator described in this paragraph improves autonomous vehicle technology by recording user inputs in response to a TOC event.

Implementations may include one or more of the following features. The driver-in-loop simulator where the input device is a steering wheel. The controller is programmed to receive scenario data. The controller is programmed to command the driver view display to show a scenario that is based on the scenario data. The driver-in-loop simulator may include a plurality of sensors in communication with the controller. The controller is programmed to simulate driving by an autonomous vehicle until the controller receives the input that is indicative of the user took control of the simulation in response to detecting the TOC event. The controller is programmed to record the input provided by the user in response to detecting the TOC event. The TOC event is a sensor failure by at least one of the plurality of sensors. Implementations of the described techniques may include hardware, a method or process, or computer software on a computer-accessible medium.

The present disclosure also describes a method for simulating an autonomous vehicle. The method includes detecting transfer of control (TOC) event in a driver-in-loop simulator. Further, the method includes displaying a notification on a human-machine interface (HMI) display that the TOC event has occurred in response to detecting the TOC event. The method further includes detecting an input provided by a user of the driver-in-loop simulator through an input device. The input is indicative that the user took control of a simulation experienced through the driver-in-loop simulator in response to detecting the TOC event. The driver-in-loop simulator described in this paragraph improves autonomous vehicle technology by recording user inputs in response to a TOC event. The notification includes a yellow steering wheel and text indicative that the user should manually take over control of the driver-in-loop simulator. The method further includes showing, via the HMI display, a green steering wheel and a text indicative that the user successfully took over manual control of the driver-in-the loop simulator after the user takes manual control of the driver-in-the loop simulator. The method further includes showing, via the HMI display, a red steering wheel and text indicative that the driver-in-the-loop simulator is disengaging autonomous driving after a predetermined amount of time has elapsed since the TOC event occurred.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
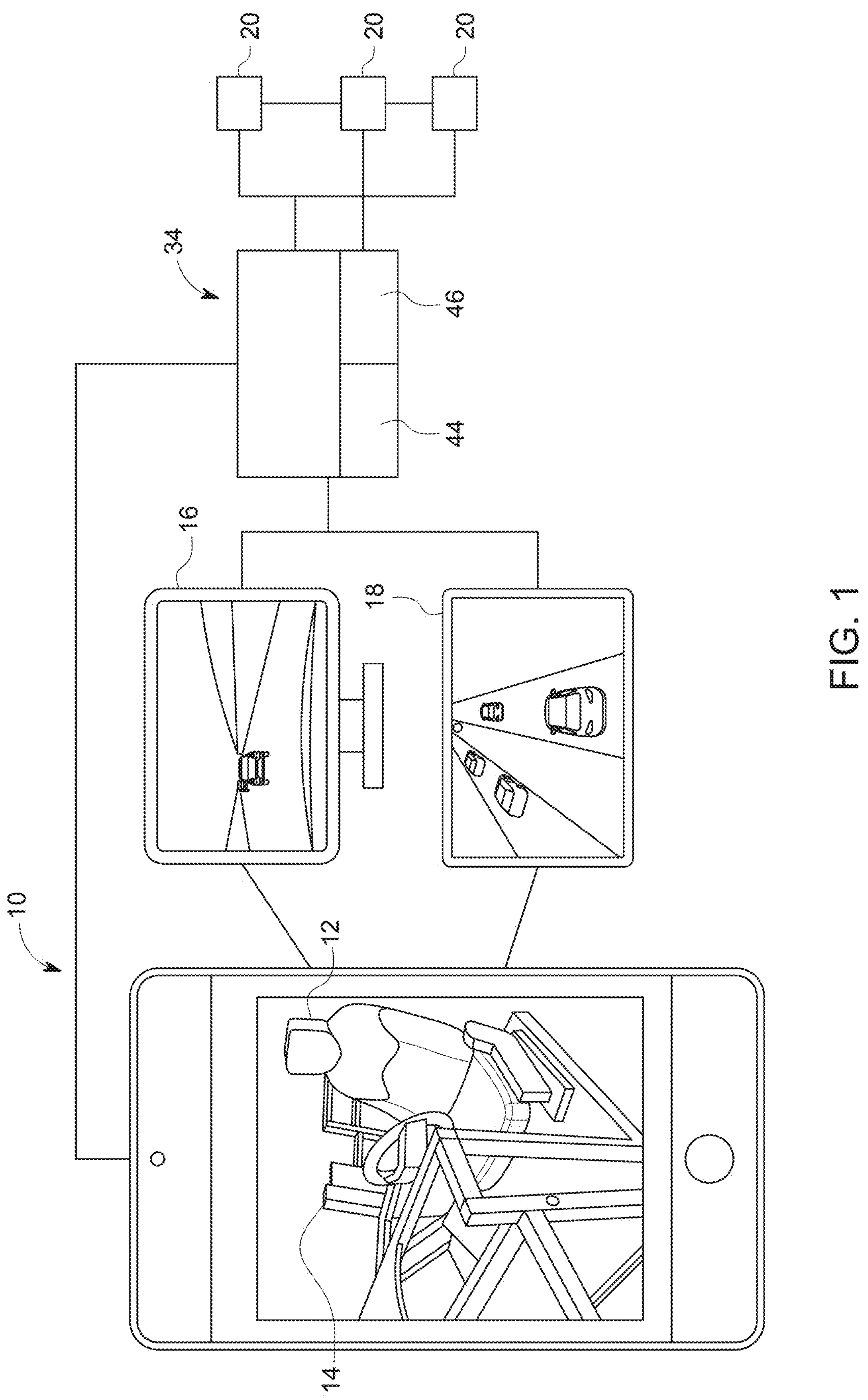
FIG. 1 is a schematic diagram of a driver-in-loop simulator.

Reference will now be made in detail to several examples of the disclosure that are illustrated in accompanying drawings. Whenever possible, the same or similar reference numerals are used in the drawings and the description to refer to the same or like parts or steps.

With reference to FIG. 1, a driver-in-loop simulator 10 configured to simulate an autonomous vehicle and includes a vehicle seat 12 and one or more input devices 14 in front of the vehicle seat 12 to simulate an autonomous vehicle. The vehicle seat 12 may include haptic actuators and a seat adjustment mechanism. The driver-in-loop simulator 10 may include a brake actuator, such as a joystick or a brake pedal. The input device 14 may be a steering wheel, a joystick, an accelerator actuator (e.g., acceleration pedal), a brake actuator (e.g., brake pedal), or any other device or actuator suitable to receive a physical input by a user. The driver-in-loop simulator 10 further include one or more driver view displays 16 and one or more human-machine interface (HMI) displays 18. The driver view display 16 is configured to show a virtual environment, simulating a driving scenario. The driver view display may be connected to a workstation running a high-quality autonomous vehicle (AV) virtual simulation environment with dynamic scenarios. The driver view display 16 may be in the form of multiple curved screens. The HMI display 18 is configured to simulate the HMI display of an autonomous vehicle. The HMI display 18 may be in communication with the AV simulation environment to show road network, vehicle positions, and HMI factors in the form of icons with notifications. The HMI display 18 may show potential messages generated by the AV system to communicate with human drivers in the driver-in-loop simulator 10. The layout of the HMI display 18 may includes road networks with real GPS information, 3D vehicle models, chevrons with trajectory guidance, and steering wheel/turning lights to be used in the TOC logic.

Further, the driver-in-loop simulator 10 includes a controller 34 and one or more sensors 20 in communication with the controller 34. The sensors 20 collect information and generate sensor data indicative of the collected information. As non-limiting examples, the sensors 20 may sense movements, actions, and or biological responses by the user of the driver-in-loop simulator 10. For example, the sensors 20 may include one or more steering angle sensors (SASs) configured to measure the steering angle of the steering wheel or another input device 14. The sensors 20 may include biological sensors, such as heart rate monitors to measure user stress.

The controller 34 is programmed to receive sensor data from the sensors 20 and includes at least one processor 44 and a non-transitory computer readable storage device or media 46. The processor 44 may be a custom-made processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media of the controller 34 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the driver-in-loop simulator 10. The controller 34 is in communication with the driver view display 16, the sensors 20, and the HMI display 18.

The instructions may include one or more separate programs, each of which comprises an ordered listing of executable instructions for implementing logical functions. The instructions, when executed by the processor 44, receive and process signals from the sensors 20, perform logic, calculations, methods and/or algorithms for automatically controlling the components of the vehicle 10, and generate control signals based on the logic, calculations, methods, and/or algorithms. Although a single controller 34 is shown in FIG. 1, the driver-in-loop simulator 10 may include a plurality of controllers 34 that communicate over a suitable communication medium or a combination of communication mediums and that cooperate to process the sensor signals, perform logic, calculations, methods, and/or algorithms, and generate control signals to automatically control features of the driver-in-loop simulator 10. The non-transitory computer readable storage device or media 46 includes machine-readable instructions (shown, for example, in FIG. 2), that when executed by the one or more processors, cause the processors 44 to execute the method 100 (FIG. 2).

Figure 2:
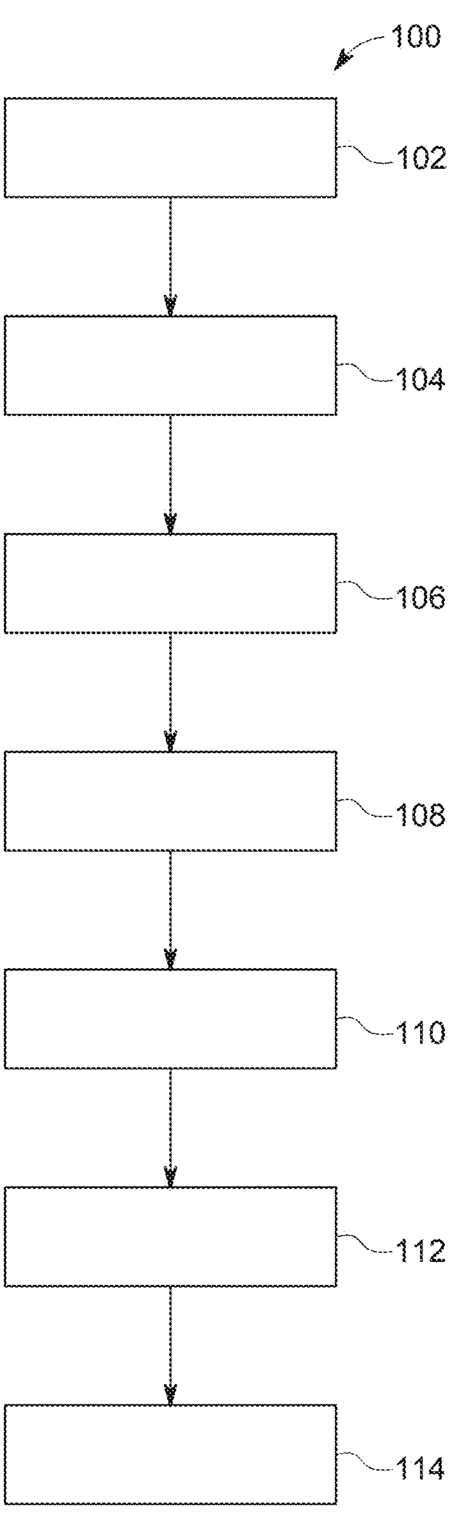
FIG. 2 is a flowchart of a method for simulating an autonomous vehicle.

FIG. 2 is a method 100 is used for simulating an autonomous vehicle and begins at block 102. At block 102, the controller 34 receives scenario data (e.g., an OpenScenario file). The scenario data includes predefined scenarios for a particular autonomous vehicle. The predefined scenarios include traffic vehicle behavior and targeting routes. The scenario data also includes TOC trigger conditions. A TOC trigger condition or a TOC event means a situation where the human driver should disengage autonomous driving and should take manual control of the autonomous vehicle. As non-limiting example, a TOC event occurs when the autonomous vehicle does not detect the leading vehicle, bad weather, inaccurate location data, sensor failure by one or more sensors 20, or when the autonomous vehicle cannot handle the complexity of the surrounding situation. The method 100 then proceeds to block 104.

At block 104, the TOC experiments are started. The controller 34 runs the scenario data to simulate a driving scenario while the human driver is in the driver-in-loop simulator 10. A dynamic scenario module parses the scenario data and places all traffic participants in the virtual environment. The bundled sensor data also captures the data when the simulated autonomous vehicle follow the predefined routes. Then, the method 100 continues to block 106.

At block 106, the sensor data is synchronized with the data generated by the virtual environment. The front view camera view (e.g., one of the sensors 20) is shown in the driver view display 16. The HMI factors, such as vehicle location, and road network layout, are shown in the HMI display 18. Then, the method 100 continues to block 108.

At block 108, the controller 34 detects a TOC event. TOC event is an event in which a human driver should disengage autonomous driving and should take manual control of an autonomous vehicle (or a simulated autonomous vehicle). As non-limiting examples, a TOC event occurs when the autonomous vehicle does not detect the leading vehicle, bad weather, inaccurate location data, sensor failure by one or more sensors 20, or when the autonomous vehicle cannot handle the complexity of the surrounding situation.

Then, the method 100 continues to block 110. At block 110, the dynamic scenario module in the driver-in-the loop simulator 10 may notify the intervention module to handle the interactive operation with the human driver/tester. Then, the method 100 continues to block 112.

At block 112, the HMI display 18 shows a notification (a "TOC notification") in response to detecting the TOC event. The notification indicates that a TOC event has occurred. At this point, the user may grab the input device 14 (e.g., steering wheel). The notification may be in the form of an icon changing colors. At this point, the sensors 20 may collect information, such as steering angle rotation rate, acceleration or brake actuation, and user's stress levels. Thus, at block 113, the controller 34 detects an input from the user (e.g., steering angle rotation rate, acceleration or brake actuation, etc.). Then, the method 100 continues to block 114.

At block 114, the controller 34 determines whether the take over operation was smooth from autonomous driving to manual mode. The driver-in-loop simulator 10 may provide feedback (e.g., sensor data) to the user to make sure that the driver-in-loop simulator 10 correctly switched from autonomous driving to manual mode to enhance the human experience. It is envisioned that the controller 34 may determine that there was a TOC failure if it takes more than a predetermined amount of time to switch from autonomous driving to manual mode since the TOC event was detected. It is contemplated that the human may manually switch from autonomous driving to manual mode. The driver-in-loop simulator 10 may also automatically switch from autonomous driving to manual mode if a TOC event is detected.

The HMI display 18 shows TOC notification with different colors at different. At the start, the HMI display 18 does not show a TOC notification. When a TOC event is detected, the HMI display 18 shows a TOC notification. At this point, the TOC notification may be a yellow steering wheel with text indicating that the user should take over manually. For instance, the text may include the phrase "Please take over manually". Once the TOC event occurs, a clock starts counting time since the TOC event. If a predetermined amount of time (e.g., ten seconds) has elapsed since the TOC event, then the HMI display 18 shows a TOC timeout or failure message. The TOC timeout or failure notification may include a red steering wheel and include text indicative that the driver-in-loop simulator 10 is disabling auto pilot. For instance, the text may include the phrase "Exiting auto pilot!!!". If the user manually takes control of the input device 14 (e.g., steering wheel) before the clock reaches the predetermined amount of time since the TOC event was detected, then the HMI display 18 shows a TOC notification indicative that the user successfully took over manual control of the driver-in-loop simulator 10. This TOC notification may include a green steering wheel and text indicative that the user successfully took over manual control of the driver-in-loop simulator 10. For instance, the text may include the phrase "Take over successful". Further, the TOC notification may include green hands icon next to the green steering wheel. When the driver-in-loop simulator 10 is ready again to engage autonomous driving after the TOC event has passed, the HMI display 18 may show a green steering wheel and text indicative that the autonomous driving is engaged.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A driver-in-loop simulator, comprising:

a vehicle seat;

a driver view display;

a human-machine interface (HMI) display;

an input device;

a plurality of sensors; and a controller in communication with the driver view display, the HMI display, the plurality of sensors, and the input device, wherein the controller includes a processor and a non-transitory computer readable medium in communication with the processor, and the controller is programmed to:

receive scenario data, wherein the scenario data includes predefined driving scenarios for an autonomous vehicle, the predefined driving scenarios include traffic vehicle behavior, targeting routes, and transfer of control (TOC) trigger conditions, wherein the TOC trigger conditions include a situation where a user, defined as a human driver, should disengage autonomous driving and should take manual control of the autonomous vehicle, including when the autonomous vehicle does not detect a leading vehicle, when particular weather conditions are detected, inaccurate location data, sensor failure by one or more of the plurality of sensors, and when the autonomous vehicle cannot handle a complexity of a surrounding situation;

simulate a driving scenario by the autonomous vehicle, wherein the driving scenario is based on the scenario data to simulate driving of the autonomous vehicle while the user is in the vehicle seat of the driver-in-loop simulator, wherein a dynamic scenario module parses the scenario data and places all traffic participants in a virtual environment within the driving scenario;

command the driver view display to show the driving scenario;

command the HMI display to show a location of the autonomous vehicle and road network layout;

detect a transfer of control (TOC) event, wherein the TOC event is an event in which one or more of the TOC trigger conditions are met;

in response to detecting the TOC event, display a notification on the HMI display that the TOC event has occurred; and in response to detecting the TOC event, detect an input provided by the user of the driver-in-loop simulator through the input device, wherein the input is indicative that the user took control of a simulation experienced through the driver-in-loop simulator.

2. The driver-in-loop simulator of claim 1, wherein the input device is a steering wheel.

3. The driver-in-loop simulator of claim 1, wherein the controller is programmed to record the input provided by the user in response to detecting the TOC event.

4. The driver-in-loop simulator of claim 3, wherein the TOC event is the sensor failure by at least one of the plurality of sensors.

5. A method for simulating an autonomous vehicle, comprising:

providing a vehicle seat, a driver view display, a human-machine interface (HMI) display, an input device, a plurality of sensors, and a controller in communication with the driver view display, the HMI display, the plurality of sensors, and the input device;

receiving scenario data, wherein the scenario data includes predefined scenarios for the autonomous vehicle, the predefined scenarios include traffic vehicle behavior, targeting routes, and transfer of control (TOC) trigger conditions, wherein the TOC trigger conditions include a situation where a user, defined as a human driver, should disengage autonomous driving and should take manual control of the autonomous vehicle, including when the autonomous vehicle does not detect a leading vehicle, particular weather conditions are detected, inaccurate location data, sensor failure by one or more of the plurality of sensors, and when the autonomous vehicle cannot handle a complexity of a surrounding situation;

simulating a driving scenario by the autonomous vehicle, wherein the driving scenario is based on the scenario data to simulate driving of the autonomous vehicle while the user is in the vehicle seat of the driver-in-loop simulator, wherein a dynamic scenario module parses the scenario data and places all traffic participants in a virtual environment within the driving scenario;

commanding the driver view display to show the driving scenario;

detecting a transfer of control (TOC) event, wherein the TOC event is an event in which one or more of the TOC trigger conditions are met;

in response to detecting the TOC event, displaying a notification on the human-machine interface (HMI) display that the TOC event has occurred; and in response to detecting the TOC event, detecting an input provided by the user of the driver-in-loop simulator through the input device, wherein the input is indicative that the user took control of a simulation experienced through the driver-in-loop simulator.

6. The method of claim 5, wherein the input device is a steering wheel.

7. The method of claim 5, further comprising recording the input provided by the user in response to detecting the TOC event.

8. The method of claim 7, wherein the TOC event is the sensor failure by at least one of the plurality of sensors.

9. The method of claim 8, wherein the notification includes a yellow steering wheel and text indicative that the user should manually take over control of the driver-in-loop simulator.

10. The method of claim 9, further comprising showing, via the HMI display, a green steering wheel and a text indicative that the user successfully took over manual control of the driver-in-the loop simulator after the user takes manual control of the driver-in-the loop simulator.

11. The method of claim 9, further comprising, showing, via the HMI display, a red steering wheel and text indicative that the driver-in-the-loop simulator is disengaging autonomous driving after a predetermined amount of time has elapsed since the TOC event occurred.

* * * * *